United States Patent [19]
Graniaris

[11] 3,838,577
[45] Oct. 1, 1974

[54] WATER CRYSTALLIZATION
[75] Inventor: Neophytos Graniaris, Riverdale, N.Y.
[73] Assignee: Struthers Patent Corp., Houston, Tex.
[22] Filed: Apr. 30, 1973
[21] Appl. No.: 355,689

[30] Foreign Application Priority Data
May 1, 1972  Great Britain .................... 20158/72

[52] U.S. Cl. ........................... 62/66, 62/114, 252/67
[51] Int. Cl. .............................................. B01d 9/04
[58] Field of Search ................. 62/66, 123, 58, 114; 252/67

[56] References Cited
UNITED STATES PATENTS
| | | | |
|---|---|---|---|
| 2,641,580 | 6/1953 | Lewis................................. | 62/114 X |
| 3,364,690 | 1/1968 | Torobin............................ | 62/123 X |

*Primary Examiner*—William E. Wayner
*Attorney, Agent, or Firm*—William Anthony Drucker

[57] ABSTRACT

The direct contact crystallization of ice in water or aqueous beverages is carried out using a mixture of Freons having a boiling point at substantially atmospheric pressure in the desired temperature range.

4 Claims, No Drawings

WATER CRYSTALLIZATION

DESCRIPTION OF THE PREFERRED EMBODIMENT

A mixture of Freon 114 and Freon 12 in a proportion by weight of about 80:20 is used as a direct contact refrigerant to form ice crystals in water solutions. The refrigerant in liquid form is introduced into water to flash into vapor to form ice crystals in the water. As ice crystals form, the water concentrates into a solution from which the crystals are removed, washed, and melted as a product in the water conversion process. Since pressures require more costly equipment and vacuum equipment may leak air into the system, the crystallization is best carried out close to atmospheric pressure. Except for Freon 318 which is far too costly, none of the Freons can be used alone as their boiling points are too high or too low near atmospheric pressure.

Freon 12 forms hydrates when used alone in the direct contact crystallization of sea water. However, the mixture of Freon 114 and Freon 12 will not form hydrates. The mixture may vary in proportions by weight of Freon 114 and Freon 12 between 90:10 and 60:40. This mixture forms ideal solutions and is an excellent working fluid for vapor-compression refrigeration which is neither flammable nor toxic. Further, the solubility of Freon is less in salt water than in fresh water and the cost of this particular mixture is within a practical range. Finally, this liquid Freon mixture may be used to wash ice crystals after they are removed from the crystallizer. The crystals are then melted in liquid Freon so that fresh water separates from it and may be removed.

The Freon mixture of this invention may be used to form ice crystals in comestible solutions to concentrate them. As one example, it may be used to form ice crystals in orange juice, the ice crystals being removed from the juice to leave it in more concentrated form. As other examples it may be used to concentrate coffee solutions, apple juice, tea and the like. What is claimed is:

1. In the process of forming ice crystals in a solution, the step of:
    introducing a mixture of Freons 114 and 12 in proportion by weight respectively between 90:10 and 60:40 into the solution to flash into vapor therein to form ice crystals in the solution.

2. The process according to claim 1 wherein the mixture of Freons is a mixture of Freon 114 and Freon 12 in a proportion by weight of substantially 80:20.

3. The process according to claim 2 wherein the solution is a comestible solution.

4. The process according to claim 2 wherein the solution is sea water.

* * * * *